April 20, 1926.

J. H. FROME 1,581,923

EDUCATIONAL APPLIANCE

Filed July 17, 1925     2 Sheets-Sheet 1

WITNESSES
William P. Goebel
Hugh H. Ott

INVENTOR
John H. Frome
BY Munn & Co
ATTORNEYS

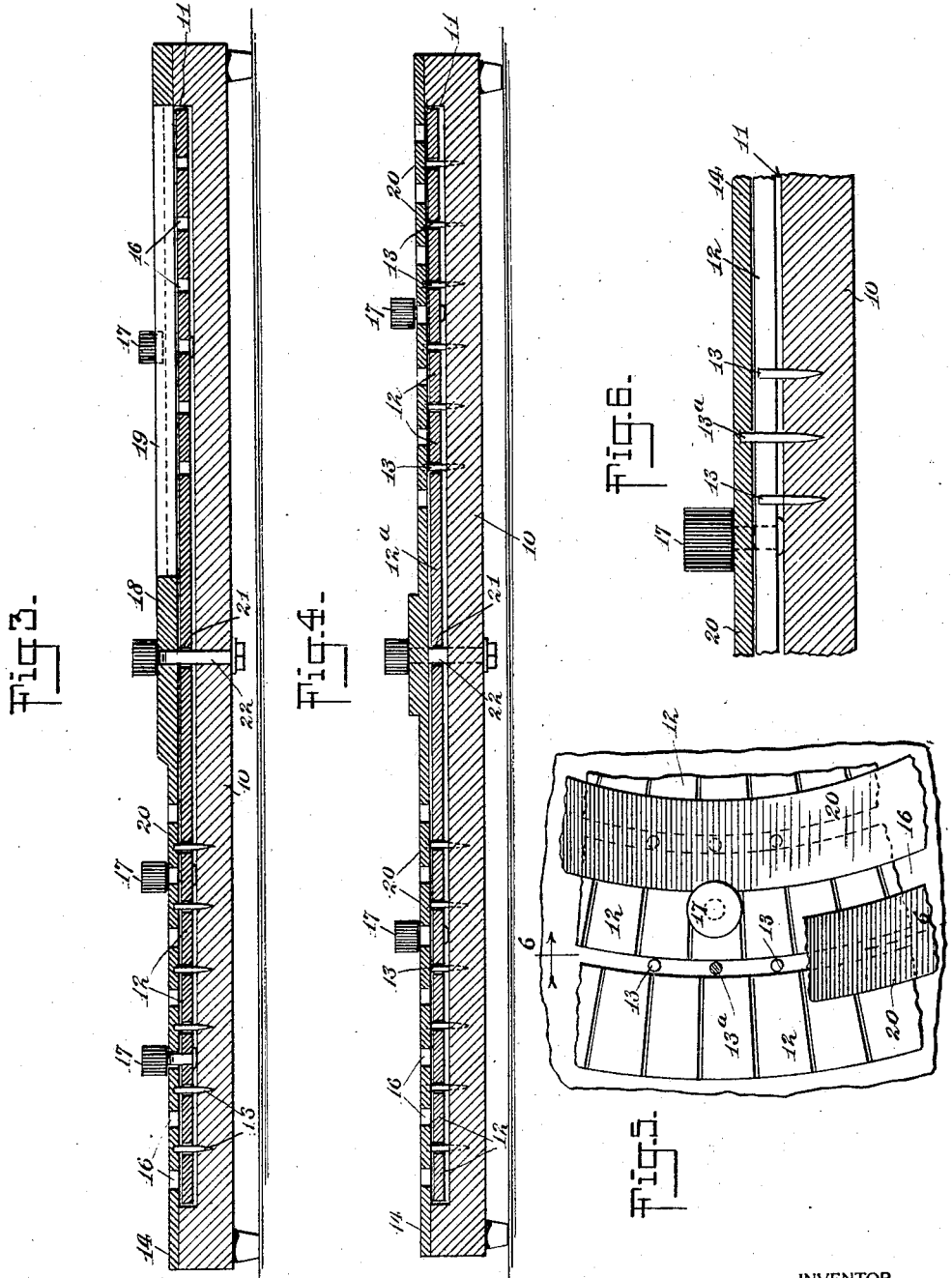

Patented Apr. 20, 1926.

1,581,923

UNITED STATES PATENT OFFICE.

JOHN HENRY FROME, OF RUSHLAND, PENNSYLVANIA.

EDUCATIONAL APPLIANCE.

Application filed July 17, 1925. Serial No. 44,261.

*To all whom it may concern:*

Be it known that I, JOHN H. FROME, a citizen of the United States of America, and resident of Rushland, in the county of Bucks and State of Pennsylvania, have invented a new and Improved Educational Appliance, of which the following is a full, clear, and exact description.

This invention has relation to educational appliances and comprehends an apparatus for teaching the construction of sentences in either a native or foreign language, the same being in the nature of an improvement over my prior United States Letters Patent No. 1,329,896 granted February 3, 1920.

The present invention contemplates an apparatus having a plurality of shiftable word-bearing elements and a casing member normally masking said elements from view except for a single slot or window opening with which any of the words of the several elements may be selectively brought into registry to display or expose the same therethrough whereby to build up and construct sentences including the subject, predicate and necessary nouns, verbs, adverbs, adjectives or other parts of speech.

One of the principal objections to an apparatus constructed in accordance with my prior patent has been found to exist in the necessity of superimposing a plurality of disks upon each other to attain the desired result, which necessarily renders the structure thick and bulky. To overcome this objection, the present invention comprehends a structure in which use is made of a plurality of concentrically arranged annular word-bearing elements all of which are disposed in the same plane and which are carried by a housing formed with a display slot or window through which any of the words of the word-bearing element may be selectively displayed whereby to build up and construct various sentences.

The invention furthermore contemplates an educational device or apparatus of the character set forth which is comparatively simple in its construction and mode of operation, inexpensive to manufacture and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Fig. 3 is a transverse sectional view therethrough taken approximately on the line indicated at 3—3 in Fig. 1.

Fig. 4 is a similar transverse sectional view taken approximately on the line 4—4 of Fig. 1.

Fig. 5 is a fragmentary plan view on an enlarged scale.

Fig. 6 is a transverse sectional view therethrough taken approximately on the line 6—6 of Fig. 5.

Figure 1:
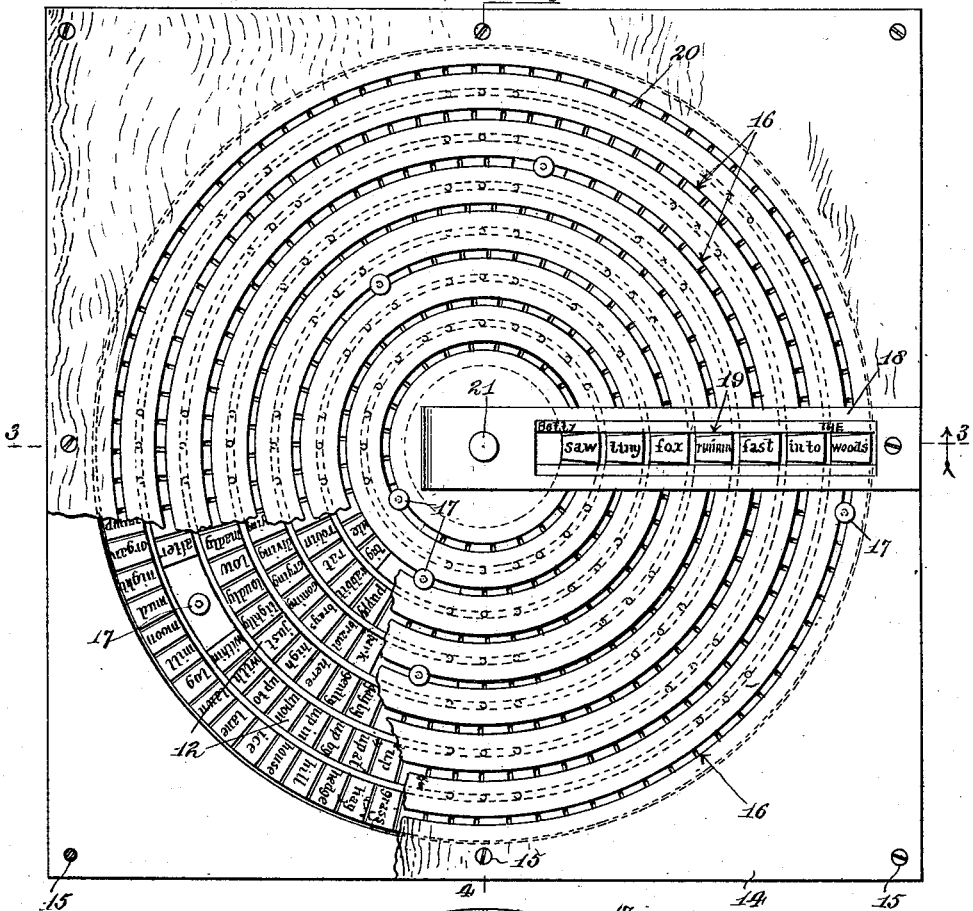
Figure 1 is a plan view of the device with parts broken away to disclose the underlying structure.
Figure 2:
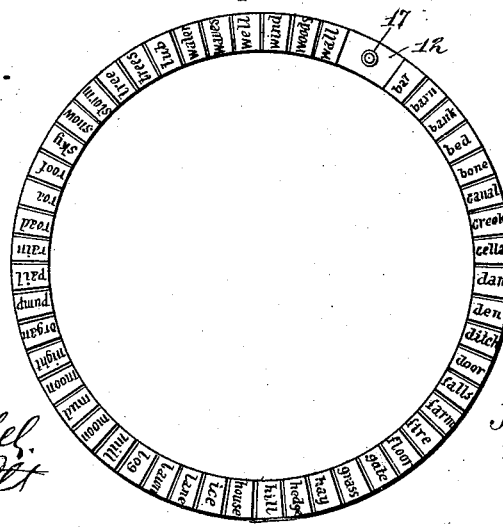
Fig. 2 is a plan view of one of the word bearing elements removed.

Referring to the drawings by characters of reference the device or apparatus comprises a base 10 having a circular recess 11 in its upper face. A plurality of annular word-bearing elements 12 are arranged concentrically within the recess 11 for rotatory movement and said elements are spaced from each other by the annular concentric series of upstanding pins or analogous devices 13. The cover plate 14 conforming in size and shape to the base 10 is arranged over the upper surface and secured thereto by fastening elements such as screws 15 which are anchored in the base. The cover plate 14 is provided with a plurality of concentric substantially annular slots 16 disposed intermediate the width of each word-bearing element 12 to accommodate the manipulating knob 17 of each word-bearing element, the shank of which knob extends through the slot. The cover plate is further provided with a boss 18 having a window opening or slot 19 and also having certain common words or indicia inscribed thereon and with which slot the words of the bearing elements 12 are designed to be singly and selectively brought into registry for exposing or visualizing a combination of said words to construct or build up sentences employing the common words or indicia inscribed on the boss 18 as part of the sentence.

In order to reinforce and support the substantially annular strips 20 defined between the annular slots 16, certain of the pins or devices indicated at 13ᵃ extend into the strips 20. The innermost or central word-bearing element indicated at 12ᵃ is more in the nature of a disk having a central opening 21 through which a journal 22 extends.

Under this construction and arrangement it is obvious that the word bearing elements are all arranged concentrically in the same plane and are independently rotatable. In use and operation by grasping the manipulating knob 17, the operator may selectively rotate the various word-bearing elements 12 to expose a combination of said words through the display slot or window opening 19 in the boss 18. The elements 12 are designed to have printed, inscribed or otherwise borne thereon words representing nouns, verbs, adverbs, adjectives and other parts of speech which are properly correlated when brought into registry with the window opening to produce or construct sentences for the instruction of children. The knobs are free to move in a path which is approximately a complete circle, being prevented from making a complete circuit only by the width of the boss 18.

I claim:

1. An educational apparatus comprising a plurality of concentrically arranged annular word-bearing elements disposed in the same plane and spaced apart radially, a housing within which said elements are mounted for rotatory movement, a covering wall constituting part of said housing having a radial window opening through which the words of each word-bearing element are selectively exposed, said covering wall having a plurality of substantially annular concentric slots disposed intermediate the width of each word-bearing element and a manipulating knob for each word-bearing element having a shank extending through the respective slot and anchored in the word-bearing element, said covering wall having a radial window opening intersecting all of said word-bearing elements for singly and selectively exposing the words of said word-bearing element through said window opening and means within the housing disposed between the adjacent periphery of each word-bearing element for guiding the same in its rotatory movement, said means comprising a plurality of annular series of guide pins.

2. An educational appliance comprising a plurality of concentrically arranged annular word-bearing elements disposed in the same plane and spaced apart radially, a housing within which said elements are mounted for rotatory movement, a covering wall constituting part of said housing having a radial window opening through which the words of each word-bearing element are selectively exposed, said covering wall having a plurality of substantially annular concentric slots disposed intermediate the width of each word-bearing element and a manipulating knob for each word-bearing element having a shank extending through the respective slot and anchored in the word-bearing element, said covering wall having a radial window opening intersecting all of said word-bearing elements for singly and selectively exposing the words of said word-bearing element through said window opening and means within the housing disposed between the adjacent periphery of each word-bearing element for guiding the same in its rotatory movement, said means comprising a plurality of annular series of guide pins, certain of said guide pins being anchored in the annular portions of the covering wall defined between the annular slots.

3. An educational device comprising a housing consisting of a base member having a circular recess in its upper face, a plurality of annular word-bearing elements of different diameters arranged concentrically within said recess and spaced apart radially, upstanding means from the bottom wall of said recess for guiding said word-bearing elements in an annular path, a covering wall for the upper side of the housing having a radial boss provided with a window opening extending across the path of movement of all of said word-bearing elements, said covering wall having a plurality of substantially annular slots disposed intermediate the width of each word-bearing element and extending from one side of the boss to the opposite side thereof, and a manipulating knob for each word-bearing element having a shank extending through its respective slot and anchored in the boss.

JOHN HENRY FROME.